(12) United States Patent
Jansen et al.

(10) Patent No.: US 7,155,896 B2
(45) Date of Patent: Jan. 2, 2007

(54) COMBUSTOR DRAIN VALVE

(75) Inventors: Harvey B. Jansen, Mesa, AZ (US);
David K. Shields, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 32 days.

(21) Appl. No.: 10/891,266

(22) Filed: Jul. 14, 2004

(65) Prior Publication Data
US 2005/0056000 A1 Mar. 17, 2005

Related U.S. Application Data

(60) Provisional application No. 60/487,026, filed on Jul. 14, 2003.

(51) Int. Cl.
*F02G 3/00* (2006.01)

(52) U.S. Cl. .................... 60/39.094; 60/734; 251/63.6; 251/62

(58) Field of Classification Search ................. 60/734, 60/39.094; 251/63.6, 62
See application file for complete search history.

(56) References Cited

U.S. PATENT DOCUMENTS

| | | | |
|---|---|---|---|
| 775,250 A | 11/1904 | Robinson | |
| 952,605 A | 3/1910 | Connors et al. | |
| 1,091,463 A | 3/1914 | Vincent | |
| 2,335,067 A * | 11/1943 | Langley | 251/62 |
| 2,664,701 A | 1/1954 | Allen et al. | |
| 3,052,444 A | 9/1962 | Kintner | |
| 3,542,332 A * | 11/1970 | Chevalier et al. | 251/63.6 |
| 3,949,963 A * | 4/1976 | Aoki | 251/63.6 |
| 4,214,727 A * | 7/1980 | Baram | 251/63.4 |
| 4,634,099 A * | 1/1987 | Danko et al. | 251/335.3 |
| 4,869,458 A * | 9/1989 | Susini et al. | 251/14 |
| 6,050,081 A | 4/2000 | Jansen et al. | |
| 6,679,472 B1 * | 1/2004 | Baugh | 251/62 |

* cited by examiner

*Primary Examiner*—William H. Rodriguez
(74) *Attorney, Agent, or Firm*—Quarles & Brady LLP

(57) ABSTRACT

A system for draining fuel from the combustion chamber of a gas turbine engine in the event of a false start includes associated passageways and a straight through flow pilot air actuated poppet valve. The valve is normally open and actuated by the pilot air to close off the combustion chamber from the drain. A return spring biases the valve to open upon release of pilot air pressure acting on the valve. The valve housing has a piston section with a pilot air chamber and a section defining the passageways for the drain. The drain passageway extends along a straight path at an oblique angle to a piston axis along which a piston actuator moves in response to the return spring and/or the pilot air pressure. The valve also includes a position feedback system for detecting the state of the valve.

24 Claims, 3 Drawing Sheets

COMBUSTOR DRAIN VALVE

CROSS-REFERENCE TO RELATED APPLICATION

This application claims benefit to U.S. provisional application Ser. No. 60/487,026 filed Jul. 14, 2003.

STATEMENT OF FEDERALLY SPONSORED RESEARCH OR DEVELOPMENT

Not applicable.

BACKGROUND OF THE INVENTION

1. Technical Field

The present invention relates to valves, and in particular, to valves for draining the combustion area of turbine engines.

2. Description of the Related Art

Gas turbine engines are commonly used in power generation and propulsion applications. Gas turbine engines have a set of rotating turbine blades to compress air leading to one or more combustors into which fuel is injected and ignited. Fuel is delivered through metering orifices to burners in the combustors under pressure through a fuel line. Combustion of the fuel turns a downstream set of blades, used for energy extraction or propulsion, and which can be used to drive the compressor blades.

Gas turbine engines typically burn gaseous fuel, such as natural gas, and ignite using liquid fuel (such as diesel fuel). Some turbine engines are capable of sustained operation burning either gas or liquid fuel. Cost, clean burning and other considerations usually dictate that natural gas is the primary fuel for sustained operation, particularly for power generation applications. However, as mentioned, liquid fuel is often used for ignition or as a backup fuel supply in the event of a disruption in the natural gas line.

Gas turbine engines are designed for lengthy continuous operation, particularly in the case of power generation. Since they ordinarily run on natural gas, the liquid fuel system is often left unused for long periods. The heat and pressure associated with combustion of the gaseous fuel can cause "coking", which occurs when the volatile components of the fuel are driven off by heat such that only a tarry deposit remains. Among other things, the coke deposits can build up on the liquid fuel burners and/or inhibit proper conduit of the liquid fuel when the engine is returned to fuel mode. When this happens at ignition, the combustion can fail causing a false start of the turbine. This false start can leave unspent liquid fuel in the combustor(s). Large gas turbines, such as those used in power generation, can have several combustion cans which can consume many gallons (35 gallons or more in some cases) of liquid fuel at ignition. This large volume of unspent liquid fuel must be drained from the combustors before ignition can be attempted again in order to prevent excessive combustion. Drain lines and collection wells are provided for this purpose.

Valving is used to open the combustors to the drain after a false start and keep the drain isolated during operation so that compression can be sustained. Conventional valves have several disadvantages particularly with regard to high pressure drops and resisting the effects of contamination. For example, common gate or globe type valves used for this purpose require the drained fuel to follow a non-linear path as it passes through the valve. This change in direction of the flow presents at least two distinct problems, namely, it causes a higher pressure drop across the valve and presents locations for the liquid fuel to collect, particularly given that the drain flow is usually not under pressure. Since the collected fuel is still in a high heat environment, it can cause a safety concern if combined with air, and it also can lead to coke deposits on the valve.

Ball-type valves are sometimes employed to allow for straight through flow of the drained fuel. The straight flow reduces the pressure drop and also alleviates some of the pooling of fuel inside the valve. However, it is still susceptible to other adverse effects of contamination. In particular, contaminants and coking deposits can arise on the non-sealing surface of the ball valve during operation (when the valve closes the drain). However, the deposit can be transferred onto the sealing surface of the valve seat when the valve is actuated. Specifically, as the ball is rotated to open, the build-up on the outer wall of the valve can rub against the valve seat. Once this occurs, the seal is compromised and turbine compression can be diminished by leakage through the valve to the drain. This in turn reduces the efficiency of the engine.

Accordingly, an improved drain valve is needed for draining liquid fuel from the combustors of gas turbine engines.

SUMMARY OF THE INVENTION

The present invention is a valve system for draining the combustion can(s) of a gas turbine engine to a drain collector, particularly after a false start. The valve system is arranged to provide for straight through flow of the drained fuel through the valve, while minimizing the adverse effects of contaminants on the sealing features of the valve. The valve is preferably normally open and actuated closed to seal off the combustion can from the drain during normal operation. After a false start of the engine, the valve is returned to open so that the unspent fuel can pass straight through the valve to the drain.

In one aspect, the drain valve includes a housing defining a drain passageway extending along a drain axis with an inlet for communicating with the combustion chamber and an outlet for communicating with the drain collector. The housing contains a valve that can move along a valve axis, which intersects the drain axis at an oblique angle, from an open position in which the valve is essentially clear of the drain passageway to a closed position in which the valve seals off communication between the inlet and outlet.

In another aspect, the invention is a drain valve having a valve housing with a pilot air inlet in communication with an air chamber and a drain passageway isolated from the air chamber and in communication between the combustion area and the drain collector. A piston has a valve and an enlarged head disposed in the air chamber of the piston housing. The piston is movable along a piston axis by application of pilot air into the air chamber acting against the piston head to seat the valve in the drain passageway at an oblique angle relative to the drain passageway and close off communication between the combustion area and the drain collector.

In another aspect the invention is a drain valve including a housing having a piston section and a drain coupler section. The piston section extends along a piston axis and defines a pilot air inlet in communication with an air chamber. The drain coupler section defines a passageway in communication with the combustion chamber and the drain collector that extends obliquely relative to the piston axis. The valve also includes a piston disposed in the piston section of the housing having a valve and an enlarged head disposed in the air chamber to be movable along the piston axis by application of pilot air into the air chamber, which acts against the piston head to seat the valve in the drain passageway and close off communication between the combustion chamber and the drain collector. The piston is biased to unseat the valve from the drain passageway upon release of the pilot air from the air chamber.

In still another aspect, the invention provides a fuel drain system. The system includes a drain passageway and a poppet valve aligned to allow for straight flow of the drained fuel. The drain passageway includes an inlet for communicating with the turbine engine combustion chamber and an outlet for communicating with the drain collector. The inlet and outlet are axially aligned along a drain axis. The poppet valve moves along a valve axis that intersects the drain axis at an oblique angle. In an open position, the valve is essentially clear of the drain passageway (inlet and outlet passageways), and in a closed position the valve prevents flow the drain passageway between the inlet and outlet.

The valve of the present invention is thus designed for use in the extreme pressure and temperature environment of turbine engines. The oblique angular arrangement of the drain passageway and the axis of valve movement allows the drain passageway to follow a straight path through the valve and permits the valve to move straight into and out of the drain passageway when seating and unseating. This allows for straight through flow of the drained fuel with minimal pressure drop. It also allows a poppet type valve to be used to seal the drain passageway with minimal susceptibility to contamination or coking at the sealing surfaces.

A crush seal can be provided about the drain passageway and concentric with the valve axis that is entirely isolated from the heat and pressure of operation of the turbine. Any contamination or coking build-up will occur at the non-sealing face of the valve. After a false start event in which the valve is opened, because of the oblique angle orientation, the valve passes straight away from the seal without any contaminated surface of the valve coming near or in contact with the sealing surface of the seal. To make the valve further resistant to contaminants, the seal is preferably of a soft material relative to that of the likely contaminants. Any small hard particles can embed themselves into the seal without interfering with the valve/seal interface.

These and still other advantages of the invention will be apparent from the detailed description and drawings. What follows is a preferred embodiment of the present invention. To assess the full scope of the invention the claims should be looked to, as the preferred embodiment is not intended as the only embodiment within the scope of the invention.

DETAILED DESCRIPTION OF THE PREFERRED EMBODIMENT

Figure 1:
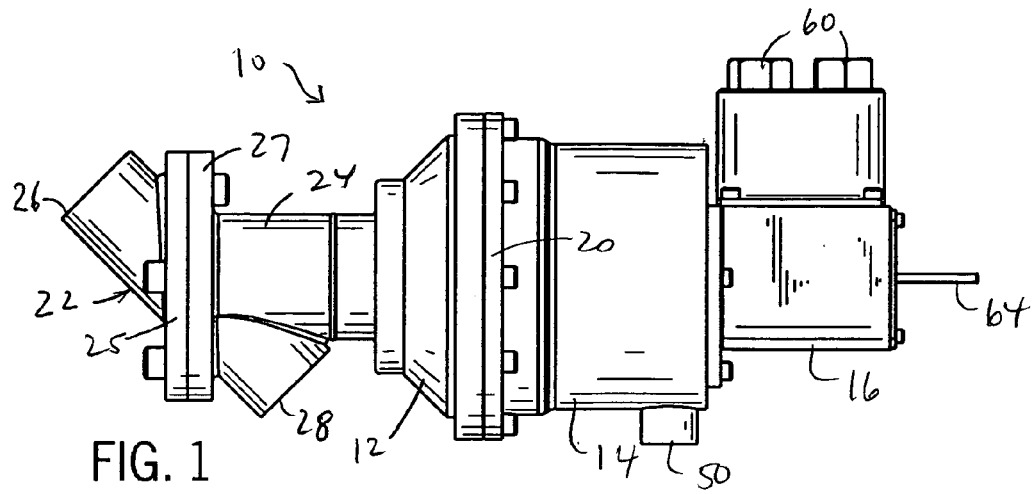
FIG. 1 is a side elevational view of the drain valve of the present invention.
Figure 2:
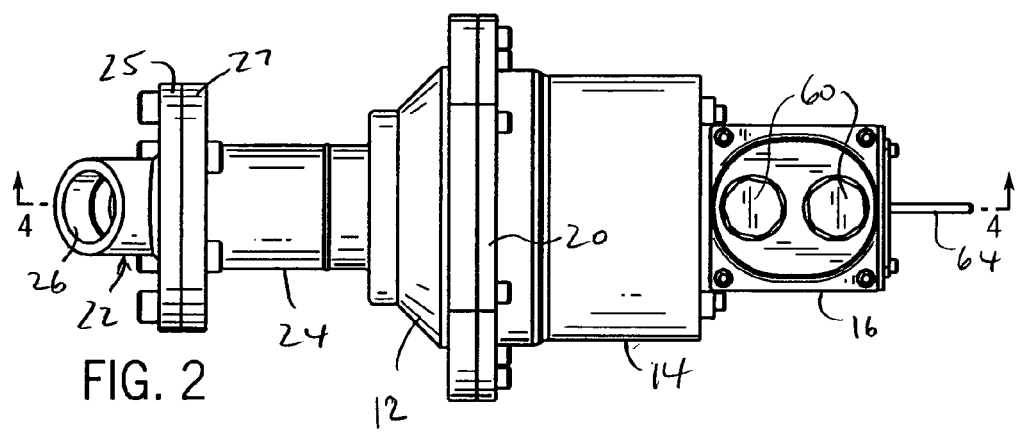
FIG. 2 is a top plan view thereof.
Figure 3:
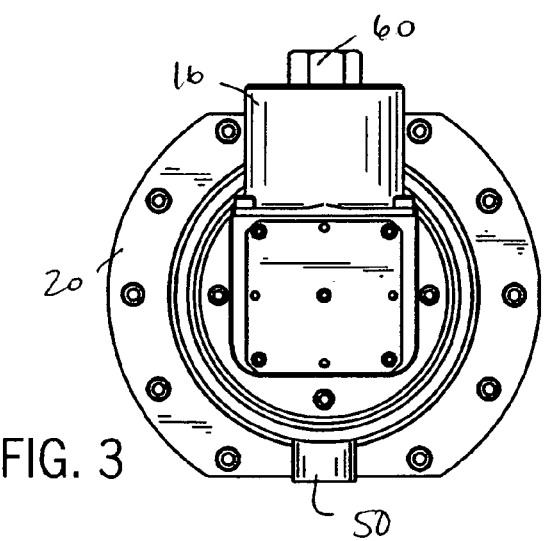
FIG. 3 is an end view thereof.

Referring to FIGS. 1–3 of the drawings, a combustor drain valve 10 of the present invention includes a body with a main housing 12, an actuator housing 14 and a position feedback housing 16. The body can be constructed of one or more separate sections joined together as needed. In the preferred form shown, the actuator housing 14 has an end cap 18 (see FIG. 4) welded to an end to which the position feedback housing 16 bolts. A retainer ring 20 is bolted in place to secure the other end of the actuator housing 14 to the main housing 12.

Figure 4:
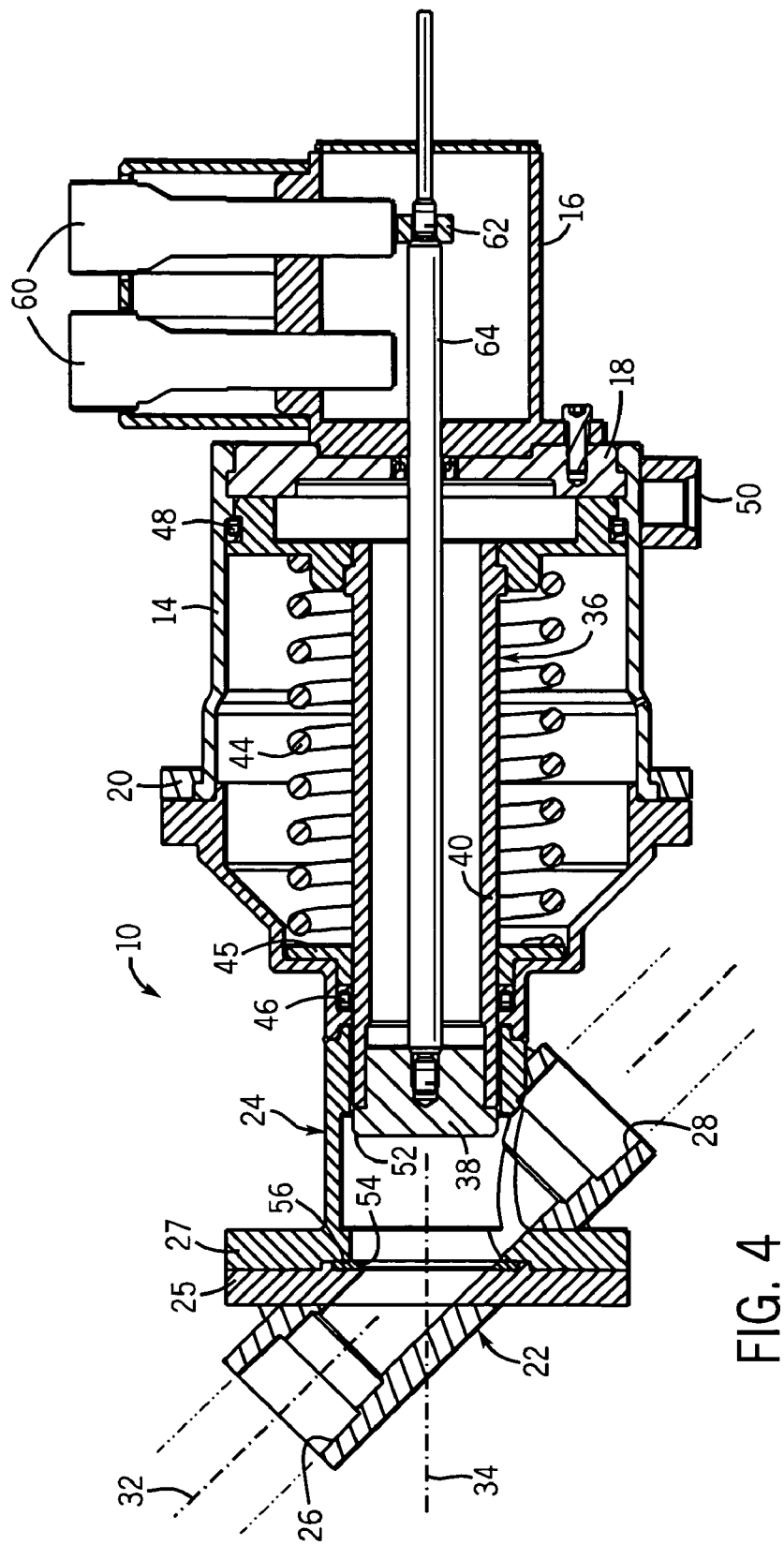
FIG. 4 is a cross-sectional view through line 4—4 of FIG. 2 showing the valve in an open position.

As shown in FIGS. 1 and 4, the main housing 12 is in part formed of two sections 22 and 24 bolted together at respective flanges 25 and 27. These two sections 22 and 24 define respective inlet 26 and outlet 28 sections of a drain passageway 30. The inlet 26 and outlet 28 have open ends that are designed to accept fittings or other couplers for joining the valve to lines leading from the combustion can(s) of a turbine engine and a drain collector, respectively. The inlet 26 and outlet 28 are aligned along a drain axis 32 thereby defining a straight flow path through the drain passageway 30. This drain axis 32 is aligned to intersect at an oblique angle a valve or piston axis 34.

Figure 5:
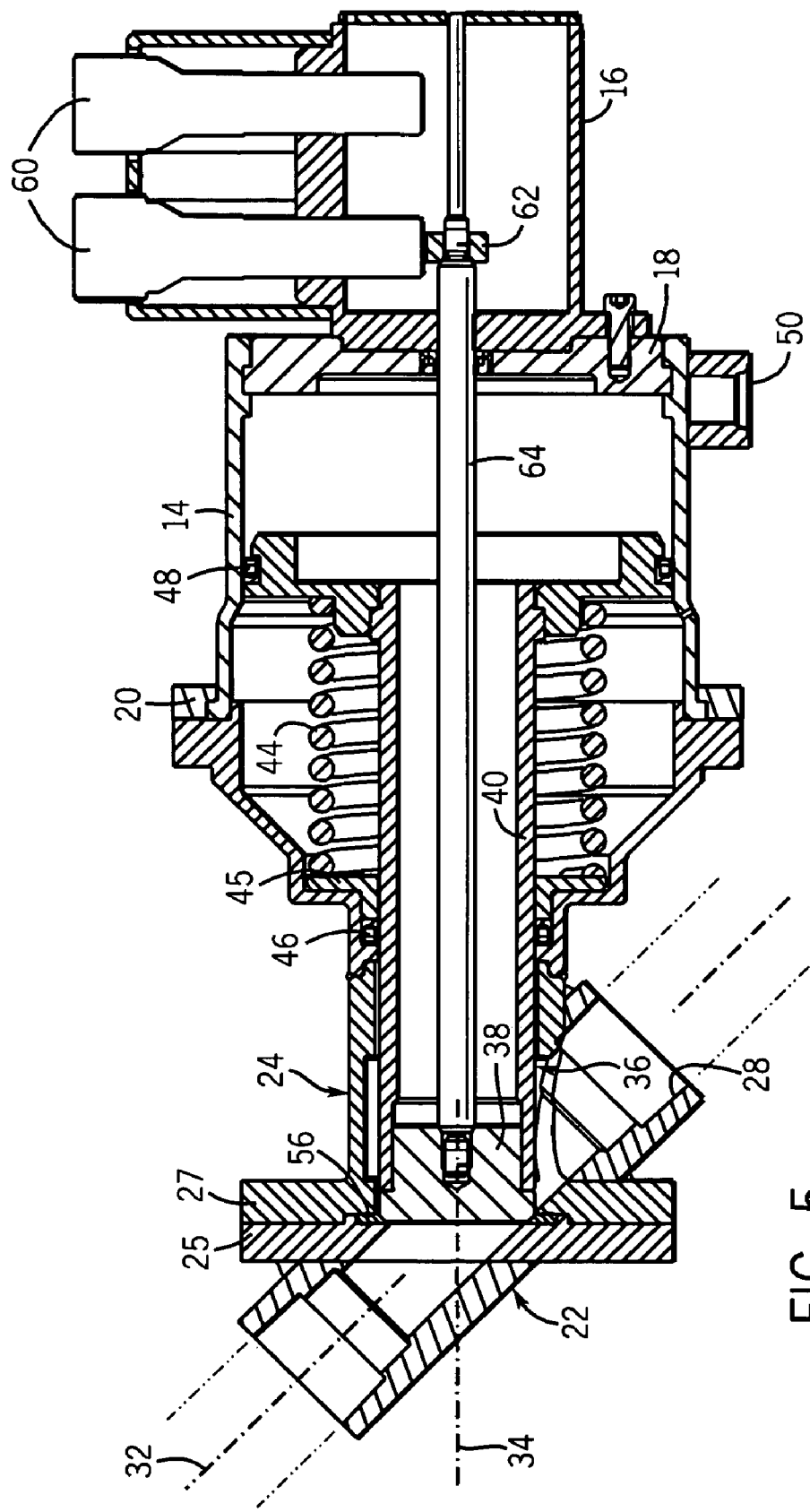
FIG. 5 is a cross-sectional view similar to FIG. 4 albeit showing the valve closing off a drain passageway.

The piston axis 34 extends essentially through the center of the long axis of the valve body and is the axis along which a piston 36 travels between the open position shown in FIG. 4 and the closed position shown in FIG. 5. A preferred form of the piston 36 includes a poppet valve 38, which is press fit into one end of an elongated tubular body 40, onto the other end of which is mounted a piston head 42. A return spring 44 fits around the tubular body 40 and presses against the back of the piston head 42 and a retainer 45 for an annular seal 46, which is preferably made of graphite filled Teflon. The seal 46 seals against the outer circumference of the tubular body 40 to isolate the drain side of the valve from the inside of the actuator housing 14. The actuator housing 14 has a smooth cylindrical inner wall section against which a piston seal 48 on the piston head 42 slides. A pilot air inlet port 50 provides air communication into the actuator housing 12, particularly into an air chamber within the cylindrical section between the piston head 42 and the end cap 18. The pilot air inlet port 50 is coupled to an air line (not shown) to pressurize the air chamber and drive the piston 36 against the spring 44 along the piston axis 34 toward the drain passageway 30. In one form, the spring 44 is preloaded at approximately 60 lbs. in the open position of FIG. 4 and is at approximately 100 lbs. at the closed position in FIG. 5. The pilot air pressure in this case is some pressure higher than 100 psi, 150 psi for example, so that it can overcome the spring force and maintain the valve securely in the closed position during operation. When the pilot air pressure is released sufficiently, the spring 44 will drive the piston back along the piston axis 34 and return it to the open position.

The pilot air pressure moves the piston 36 along the piston axis 34 until the poppet valve 38 ends up in the closed position shown in FIG. 5 in which the angled sealing surface 52 of the poppet valve 38 seats against the angled seat 54 of a seal 56. The seal 56 preferably forms a crush seal between the flanges 25 and 27. This is accomplished by using a seal of softer material than that of the housing flanges and also by undersizing the groove holding the seal such that when the flanges are bolted together the seal will compress and create high bearing loads against the flanges to form a tight seal. In a preferred form, the housing sections of the valve body are steel, and the seal is a softer metal, such as copper, which has sufficient heat resistant capabilities. The softer, crush seal is also advantageous because small, hard particles that may come in contact with the seal when the valve is in the open position can become embedded into the seal, rather that become lodged between the valve and seat interface, thereby promoting a better seal in a contaminated environment.

As can be seen in FIG. 5, the seal 56 is supported and protected at opposite faces by virtue of its position between the flanges 25 and 27, leaving only the angled seat 54 of the seal 56 exposed when the poppet valve 38 is unseated. When seated, however, the entire seal 56 is isolated from the inlet 26 by virtue of the sealing surface 52 of the poppet valve 38 seating against the seat 54 of the seal 56. The face of the poppet valve 38 remains exposed to the inlet 26 when closed, however, its sealing surface 52 is not. As noted above, the seal 56 and the poppet valve 38 are disposed at an oblique angle relative to the drain passageway 30. This not only allows for a straight drain passageway, and thus low pressure drop, but also allows the poppet valve 38 to unseat from the seal 56 by moving straight back along the piston axis 34. This in turn prevents the face surface of the poppet valve 38, which is exposed to contaminants and likely to have coke build-up after prolonged operation of the engine, from coming into contact with the sealing surface of the seat 52 when the poppet valve 38 is opened. This maintains the integrity of the valve seal in an otherwise extreme heat and contaminated environment. A tight seal is critical to prevent leaking of engine compression to drain, and thereby maintain the efficiency of the engine.

As shown in FIGS. 4 and 5, the valve 10 also includes a position feedback system including a pair of sensors, such as proximity sensors 60, that detect (via magnetic flux) the presence of a magnetic switch 62, preferably of a ferrous metal, which is mounted to an elongated indicator rod 64. The indicator rod 64 extends along the piston axis 34 through a sealed opening in the end cap 18 and the tubular body 40 of the piston 36. One end is threaded into the back of the poppet valve 38 and the other end fits through an opening in housing 16 to extend outside the valve body when in the open position of FIG. 4. This end provides visual indication of the state of the valve.

As mentioned, the preferred application for the valve of the present invention is in the drain system for a gas turbine engine. Specifically, the valve is designed to isolate a combustion chamber or can of the engine from the drain so that engine compression can be maintained during normal operation, in which conventional engines burn gaseous fuel. Typically, there are several combustion cans for each turbine. Some conventional power generation turbine engines have 14 combustion cans coupled in upper and lower pairs. Thus, a total of seven valves of the present invention would be used to control the draining of fuel from each of the seven combustion can pairs.

In any event, the valve stays in the closed state shown in FIG. 5 for prolonged periods of operation, particularly when the turbine is used for power generation. The inlet side of the valve is thus open to the high temperature and pressure environment of the combustion chambers for prolonged periods. Fuel contaminants and coking can build up at the inlet side, however, as described above, not on the seal 56 or the sealing surface of the poppet valve 38. Coking and contaminants can also build up on the valves delivering liquid fuel to the combustion cans for start up, and in some cases, when the fuel supply is changed "on the fly" during operation. As is common, after the turbine is shut down after long periods of use, the attempted re-start can fail due to the contamination of the burner nozzles or other fuel delivery components. The large volume of unspent liquid fuel delivered to the combustion cans are drained by opening the drain valve 10 to the position in FIG. 4. This is accomplished by releasing or venting the pilot air pressure in the air chamber and allowing the spring 44 to return the piston/valve to its normally open position.

As mentioned, the oblique arrangement of the drain and piston axes allows the drained fuel to pass straight through the valve. Thus, very little pressure drop occurs across the valve and the fuel will drain without collecting inside the valve, which greatly reduces the opportunity for coking or other contaminant build up inside the valve. And, the straight axial movement of the poppet valve 38 from the oblique drain passage prevents contaminants from the exposed areas of the poppet valve from contacting and being transferred to the sealing seat of the seal when actuated. Thus, the valve provides for high seal integrity in a contaminated environment.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

We claim:

1. A drain valve for controlling flow from a combustion area of a turbine engine to a drain collector, the drain valve comprising a housing defining a drain passageway extending along a drain axis with an inlet for communicating with the combustion chamber and an outlet for communicating with the drain collector, the housing containing a poppet valve movable along a valve axis that intersects the drain axis at an oblique angle, the valve being air actuated and movable along the valve axis to an open position in which the valve is essentially clear of the drain passageway to a closed position in which the valve mates with a valve seat to close off communication between the inlet and outlet.

2. The drain valve of claim 1, wherein the valve seat is disposed obliquely about the drain axis and concentric with the valve axis.

3. The drain valve of claim 2, wherein the valve and the valve seat have mating sealing surfaces, and wherein the sealing surfaces are not exposed to the drain passageway when the valve is in the closed position.

4. The drain valve of claim 1, wherein the valve is biased in the open position.

5. The drain valve of claim 1, wherein the valve is held in the closed position by pilot air pressure.

6. The drain valve of claim 1, further including a piston having an enlarged piston head against which pilot air pressure acts to drive the piston along the valve axis.

7. The drain valve of claim 6, wherein the valve is integral with the piston.

8. The drain valve of claim 7, wherein the housing defines an air chamber in communication with a pilot air inlet port and wherein the pilot air pressure acts against the piston head to move the valve into the closed position.

9. The drain valve of claim 8, further including a return spring acting against the piston to bias the valve to the open position in the absence of pilot air pressure in the air chamber.

10. The drain valve of claim 1, further including a position feedback system for detecting the state of the valve.

11. The drain valve of claim 10, wherein the position feedback system includes an indicator member extending from the valve proximate to a sensor.

12. The drain valve of claim 11, wherein the indicator member extends to an exterior of the housing at least when the valve is in the open position.

13. The drain valve of claim 1, wherein at least one of the inlet and the outlet is an integral part of the housing.

14. The drain valve of claim 13, wherein the inlet is a separate component mounted to the housing in axial alignment with the outlet.

15. A drain valve for controlling flow from a combustion area of a turbine engine to a drain collector, the drain valve comprising:
 a valve housing having a pilot air inlet in communication with an air chamber and a straight drain passageway isolated from the air chamber and in communication between the combustion area and the drain collector; and
 a piston having a valve and an enlarged head disposed in the air chamber of the piston housing, the piston being movable along a piston axis by application of pilot air into the air chamber acting against the piston head to seat the valve in the drain passageway at an oblique angle relative to the drain passageway and close off communication between the combustion area and the drain collector.

16. The valve of claim 15, wherein the drain passageway extends at an oblique angle relative to the piston axis.

17. The valve of claim 15, wherein the piston is biased to unseat the valve from the drain passageway.

18. The valve of claim 15, further including a return spring disposed about the piston axis acting on the piston head in opposition to the pilot air.

19. The valve of claim 15, further including a seal disposed about the drain passageway and concentric with the piston axis having a sealing surface against which the valve seats.

20. The valve of claim 15, further including a feedback system for detecting the position of the valve.

21. A drain valve for controlling flow from a combustion chamber of a turbine engine to a drain collector, the drain valve comprising:
 a housing having a piston section and a drain coupler section, the piston section extending along a piston axis and defining a pilot air inlet in communication with an air chamber, the drain coupler section defining a passageway in communication with the combustion chamber and the drain collector extending obliquely relative to the piston axis; and
 a piston disposed in the piston section of the housing and having a valve and an enlarged head disposed in the air chamber to be movable along the piston axis by application of pilot air into the air chamber acting against the piston head to seat the valve in the drain passageway and close off communication between the combustion chamber and the drain collector, wherein the piston is biased to unseat the valve from the drain passageway upon release of the pilot air from the air chamber.

22. A drain system for draining fuel to a drain collector from the combustion chamber of a gas turbine engine in the event of a false start, the drain system comprising:
 an inlet passageway for communicating with the turbine engine combustion chamber;
 an outlet passageway for communicating with the drain collector, the outlet passageway being axially aligned with the inlet passageway along a drain axis; and
 a poppet valve movable along a valve axis that intersects the drain axis at an oblique angle between an open position in which the valve is essentially clear of the inlet and outlet passageways and a closed position which flow between the inlet and outlet passageways is prevented, wherein the valve is normally open and actuated to the closed position
 wherein pilot air pressure actuates the valve to the closed position and a spring returns the valve to the open position in the absence of the pilot air pressure.

23. The drain system of claim 22, wherein the valve includes a housing having a pilot air inlet in communication with an air chamber and a piston having a head disposed in the air chamber against which pilot air pressure acts to move the valve to the closed position.

24. The drain system of claim 22, further including a position feedback system for detecting the state of the valve.

* * * * *